United States Patent
Moon et al.

(10) Patent No.: US 7,715,804 B2
(45) Date of Patent: May 11, 2010

(54) KEYPAD DISPLAY METHOD AND APPARATUS OF PORTABLE DEVICE

(75) Inventors: Byoung-Woo Moon, Gwangju-si (KR); Sung-Chul Yang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 850 days.

(21) Appl. No.: 11/542,342

(22) Filed: Oct. 3, 2006

(65) Prior Publication Data
US 2007/0109260 A1 May 17, 2007

(30) Foreign Application Priority Data
Nov. 11, 2005 (KR) .................. 10-2005-0108260

(51) Int. Cl.
*H04B 1/38* (2006.01)
(52) U.S. Cl. ............... 455/90.3; 455/575.1; 455/556.1; 455/566; 455/556.2; 455/575.3; 455/550.1; 455/557; 361/93.1; 235/472.01
(58) Field of Classification Search ............ 455/550.1, 455/90.3, 556.1, 557, 556.2, 575.3, 566, 455/575.1; 235/472.01; 361/93.1
See application file for complete search history.

(56) References Cited
U.S. PATENT DOCUMENTS

| | | | | |
|---|---|---|---|---|
| 5,848,356 A | * | 12/1998 | Jambhekar et al. | 455/403 |
| 5,884,193 A | * | 3/1999 | Kaplan | 455/565 |
| 5,966,671 A | * | 10/1999 | Mitchell et al. | 455/550.1 |
| 7,202,906 B2 | * | 4/2007 | Ijas et al. | 348/376 |
| 7,373,120 B2 | * | 5/2008 | Messel et al. | 455/157.2 |
| 7,440,770 B2 | * | 10/2008 | Miyashita | 455/550.1 |
| 7,558,606 B2 | * | 7/2009 | Lan | 455/575.1 |
| 7,565,183 B2 | * | 7/2009 | Vance et al. | 455/575.1 |
| 7,570,943 B2 | * | 8/2009 | Sorvari et al. | 455/414.1 |

* cited by examiner

*Primary Examiner*—Marceau Milord
(74) *Attorney, Agent, or Firm*—The Farrell Law Firm, LLP (57) ABSTRACT

A keypad display method of a portable device includes initializing by partitioning a keypad display area and storing each partition area corresponding to individual gradients; checking whether the operation mode requires a keypad display; displaying a keypad in a specific area of a screen; detecting the gradient of the portable device; selecting the partition area corresponding to the detected gradient; and expanding and displaying the selected partition area. The apparatus includes a gradient sensing unit; a storage unit of expanded partition area information for each gradient; a control unit selecting expanded partition area information corresponding to the gradient; and a display area management unit reconfiguring information to be displayed according to the expanded partition area information.

22 Claims, 7 Drawing Sheets

| PARTIAL AREA | PRE-EXPANSION COORDINATES | KEYPAD DISPLAY INFORMATION |
|---|---|---|
| PARTIAL AREA 1 | COORDINATE 1 | KEYPAD DISPLAY INFORMATION 1 |
| PARTIAL AREA 2 | COORDINATE 2 | KEYPAD DISPLAY INFORMATION 2 |
| PARTIAL AREA 3 | COORDINATE 3 | KEYPAD DISPLAY INFORMATION 3 |
| PARTIAL AREA 4 | COORDINATE 4 | KEYPAD DISPLAY INFORMATION 4 |

| GRADIENTS | EXPANDED PARTITION AREA |
|---|---|
| GRADIENT 1 | PARTIAL AREA 1 |
| GRADIENT 2 | PARTIAL AREA 2 |
| GRADIENT 3 | PARTIAL AREA 3 |
| GRADIENT 4 | PARTIAL AREA 4 |

KEYPAD DISPLAY METHOD AND APPARATUS OF PORTABLE DEVICE

PRIORITY

This application claims priority under 35 USC §119 to an application entitled "Keypad Display Method and Apparatus of Portable Device" filed in the Korean Industrial Property Office on Nov. 11, 2005 and assigned Serial No. 2005-108260, the contents of which are incorporated herein by reference.

BACKGROUND OF THE INVENTION

1. Field of the Invention

The present invention relates to a keypad display method and apparatus of a portable device, and more particularly to a keypad display method and apparatus for displaying a partially expanded keypad of a portable device.

2. Description of the Prior Art

Various types of portable devices are currently being developed (for example, a personal digital assistant (PDA), a mobile phone, etc.) according to the developing capabilities of communication technology. In particular, various types of user interfaces, such as a keypad having hardware buttons and a keypad utilizing a touch screen, have been applied to portable devices.

In the latter case, a user inputs characters by touching a keypad displayed in a Liquid Crystal Display (LCD) window of a portable device (a so-called soft-button device) with his/her finger or a stylus pen. However, the user of the portable device has a high possibility of mistakenly touching adjacent buttons, due to the limited size of the screen and soft-buttons included in the keypad that are too small. In other words, it has a disadvantage of causing many character input errors in the case of a portable device that inputs characters through soft-buttons.

Additionally, the user has to use a backspace button or delete button to correct such errors, but further errors during the selection of these buttons may be induced, because the corresponding soft-buttons for the backspace button or delete button are also too small.

SUMMARY OF THE INVENTION

In order to solve the above problems, an object of the present invention is to provide a keypad display method and apparatus of a portable device that can reduce character input errors.

Another object of the present invention is to provide a keypad display method and apparatus of the portable device that helps a user to search input characters quickly.

Another object of the present invention is to provide a keypad display method and apparatus of a portable device that expands a specific area of a keypad.

In order to achieve the above objects, a keypad display method of a portable device according to the present invention includes initializing by partitioning a keypad display area of a portable device and storing each partition area corresponding to specific angles of slope of the portable device (hereafter referred to as a gradient); checking whether the operation mode of the portable device requires a keypad display; displaying a keypad in a specific area of a portable device screen, if the operation mode of the portable device requires a keypad display, according to the above check result; detecting the gradient of the portable device; selecting a partition area corresponding to the detected gradient referring to the information stored in the initialization step; and expanding and displaying the selected partition area.

Further, the above method preferably includes a step of confirming the expanded display area by selecting a predetermined hard-key button.

Additionally, the expansion step preferably displays a pop-up in a predetermined area of the entire keypad area, displays an expanded partition area in the center of the entire keypad area, or displays an expanded partition area based on a corner point of the partition area.

In addition, in order to achieve the above objects, a keypad display apparatus of a portable device according to the present invention includes a gradient sensing unit detecting the gradient of the portable device; a storage unit of expanded partition area information for each gradient, which stores screen partition information of the portable device and expanded partition area information corresponding to the gradient of the portable device; a control unit selecting partition area information to be expanded corresponding to the gradient from the storage unit of expanded partition area information for each gradient, if the gradient of the portable device is transferred from the gradient sensing unit; and a display area management unit reconfiguring information to be displayed on the portable device screen according to the expanded partition area information.

Additionally, the storage unit of the expanded partition area information for each gradient preferably includes a first database that stores partition area information by dividing the keypad display area of the portable device into a predetermined number of partition areas, and a second database that stores the partition areas corresponding to each gradient. The first database includes a partial area field storing identification information of the partition area, a pre-expansion coordinate information field storing pre-expansion coordinates of the corresponding partition area, and a keypad display information field storing keypad display information included in the corresponding partition area. The second database includes a gradient field storing gradient information that is a base to expand and display a specific area of the keypad in the portable device, and an expanded partition area field storing information of an area to be expanded among the partition areas according to the corresponding gradient information.

Additionally, the display area management unit preferably reconfigures screen display information of the portable device so that the expanded partition area is displayed as a pop-up in a predetermined area of the whole keypad area.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENTS

Hereinafter, preferred embodiments of the present invention will be described in detail with reference to the accompanying drawings. The same reference number will be used for the same or like components in the accompanying drawings. Additionally, detailed explanations for well-known functions and compositions will be omitted to avoid obscuring the present invention.

Figure 1:
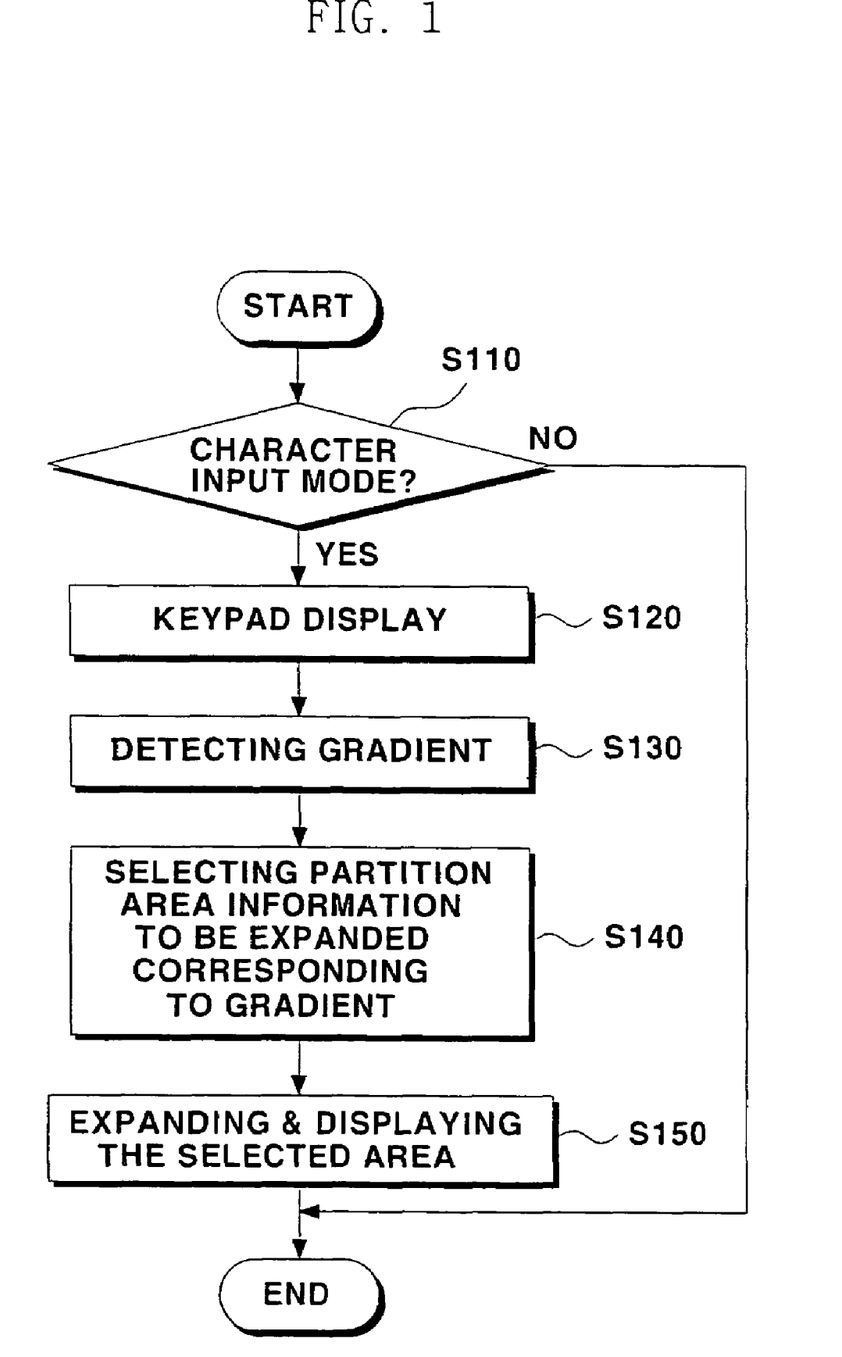
FIG. 1 is a flow chart showing a keypad display method of a portable device according to the present invention.

FIG. 1 is a flow chart showing a display method that expands a portion of soft-buttons in the display of the portable device.

In step S110, the portable device identifies whether the current operation mode is an operation mode requiring a keypad. Generally, the keypad of the portable device is displayed as a character input mode (for example, message input, registering a schedule, and storing a memo), and thereby the portable device in FIG. 1 identifies whether the character input mode is in operation.

As the result of the above identification in step S110, if the portable device is operating in the character input mode, the portable device displays a keypad (namely, a soft-button keypad) in a partial area of the portable device screen in step S120. Here, the portable device preferably displays the keypad by utilizing pre-stored keypad information (for example, key arrangement information).

The portable device, which displays a keypad on the screen in step S120, then detects the gradient of the portable device in step S130, selects expanded partition area information corresponding to the gradient in step S140, and then displays the selected area on the screen in step S150.

For this purpose, the portable device preferably includes a gradient sensing unit (for example, a gradient sensor, or a gravity sensor) to detect the gradient of the portable device, and stores expanded partition area information corresponding to the gradient of the portable device. The portable device preferably divides a keypad area displayed on the screen into a predetermined number of areas, and stores information of the partition areas corresponding to individual gradients of the portable device. Here, the gradient of the portable device preferably has a specific value or range.

Additionally, the step S150 preferably expands and displays the detected area as a pop-up in the center of the whole keypad area. However, the expanded display area of the detected area is not limited to the center of the whole keypad area. For example, the expanded display area of the detected area may be expanded and displayed based on one of the four corner points of the partition area.

The portable device, which has expanded and displayed a portion of the keypad, preferably has to decide whether to maintain the expanded display area only when a key button for confirmation (for example, a hard-key button) is pressed. That is, once the expanded display area has been confirmed, it is preferable to retain the displayed expanded partition area even if the gradient is altered. This is to prevent the content of the screen display from being from being unstably altered due to gradient changes of the portable device when key input is performed referring to the expanded display area.

As described above, a user performs key input using the expanded display area, once the expanded display area has been confirmed. For example, the user may perform key input by selecting a soft-button included in the expanded display area, or by selecting a hard-key button after moving a cursor with direction keys or tilting the portable device.

Figure 2:
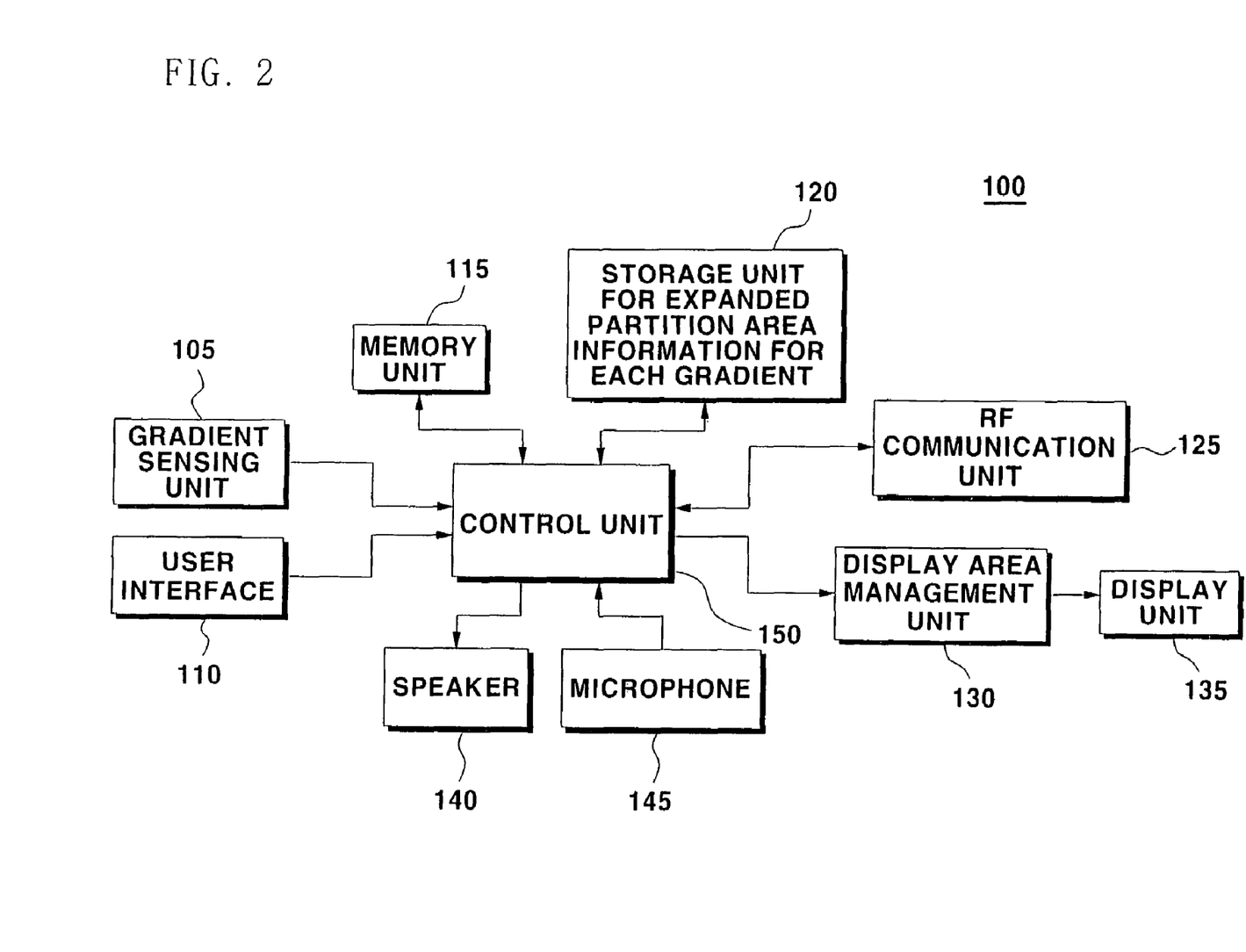
FIG. 2 is a schematic block diagram showing a keypad display apparatus of a portable device according to the present invention.

FIG. 2 is a schematic block diagram showing a keypad display apparatus of a portable device according to an example embodiment of the present invention. Referring to FIG. 2, a portable device 100 having a keypad display apparatus according to the present invention includes a gradient sensing unit 105, user interface (I/F) unit 110, memory unit 115, storage unit of expanded partition area information for each gradient 120, RF communication unit 125, display area management unit 130, display unit 135, speaker 140, microphone 145, and control unit 150.

The gradient sensing unit 105 detects the gradient of the portable device, and transfers its result to the control unit 150. For example, when the portable device is tilted towards one of x-axis, y-axis, and z-axis, the base axis and a value of the gradient is detected. For this purpose, the gradient sensing unit 105 preferably includes either a gradient sensor or a gravity sensor.

The user interface (I/F) unit 110 provides an interface with a user. For example, the user interface 110 inputs an operation signal from the user for operation control of the portable device 100. The memory unit 115 stores information related to the operation of the portable device 100 (for example, a driver program for the operation control of the portable device, data related to the driver program, a phone list, addresses, short messages, etc.). For example, the memory unit 115 stores key arrangement information of keypads (namely, soft-button keypads) to be displayed on the screen of the portable device 100.

Figure 3:
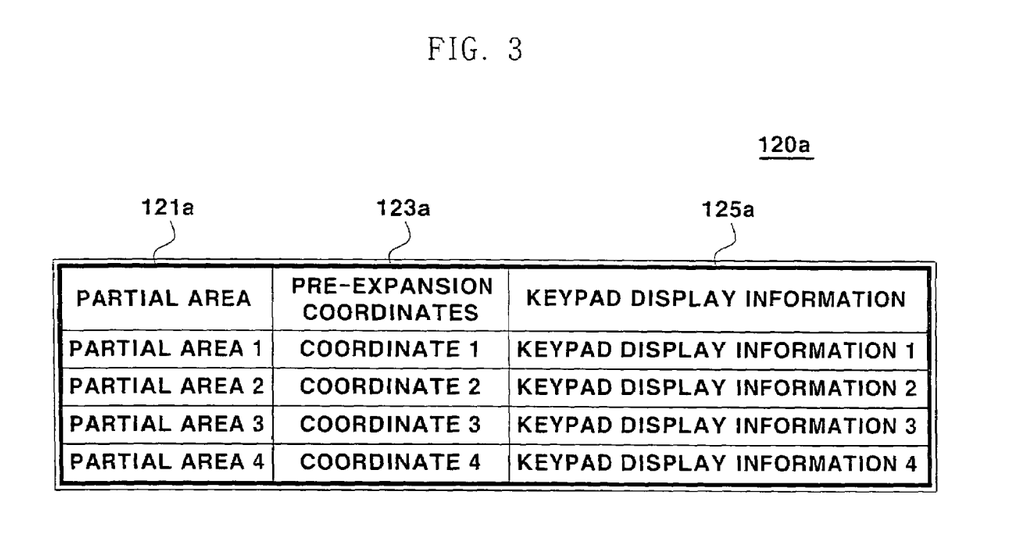
FIGS. 3 and 4 show examples of information required for partitioning and expanding a keypad screen in a keypad display apparatus of a portable device according to the present invention.
Figure 4:
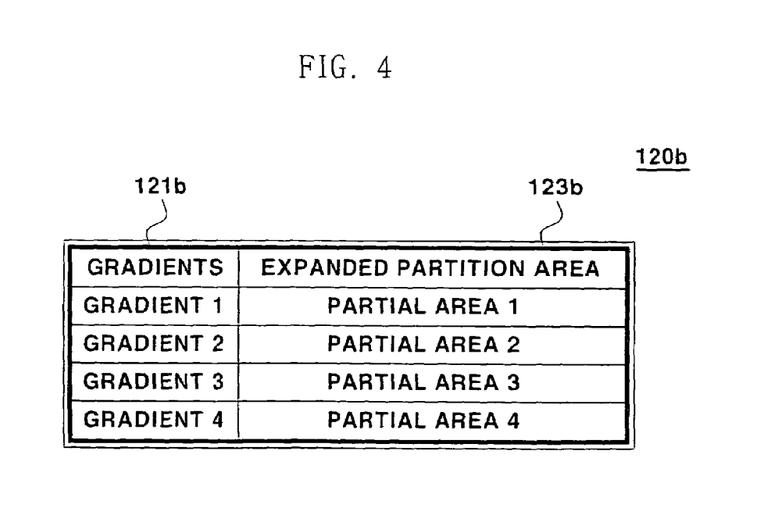

The storage unit of expanded partition area information for each gradient 120 stores screen partition information of the portable device and expanded partition area information corresponding to the gradient of the portable device. For example, the storage unit of expanded partition area information for each gradient 120 stores partition area information that a keypad area displayed on the screen of the portable device is divided into a predetermined number partition areas, and stores information of the partition areas corresponding to the individual gradients of the portable device. Here, the gradient of the portable device corresponding to the partition area preferably has a specific value or range. Preferable examples of information stored in the storage unit of expanded partition area information for each gradient 120 are shown in FIGS. 3 and 4. The examples of information stored in the storage unit of expanded partition area information for each gradient 120 will be described below referring to FIGS. 3 and 4.

The RF communication unit 125 provides a communication interface utilizing a wireless network, and controls data communication through the wireless network.

The display area management unit 130 is controlled by the control unit 150, and manages information to be displayed on the screen of the portable device 100. For example, the display area management unit 130 receives information from the control unit 150 of a specific area to be expanded among the information displayed on the screen of the portable device 100, and manages a display area on the screen of the portable device 100 according to the information. Particularly, the information to be displayed on the screen of the portable device 100 is reconfigured referring to the specific area information to be expanded and displayed, and its result is transferred to the display unit 135.

The display unit 135 displays image information transferred from the display area management unit 130, referring to the screen display information.

The speaker 140 is controlled by the control unit 150, and outputs sound signals. The microphone 145 collects sound signals (for example, a user's voice) from the surroundings, and transfers them to the control unit 150.

The control unit 150 controls the portable device 100 with the signals input through the user interface unit 110, or with operation program data stored in the memory unit 115. For example, if a gradient of the portable device is transferred from the gradient sensing unit 105, the control unit 150 detects expanded partition area information corresponding to the gradient transferred from the storage unit of expanded partition area information for each gradient 120, and transfers the expanded partition area information to the display area management unit 130.

In this example, the keypad display apparatus according to the present invention preferably includes gradient sensing unit 105, user interface (I/F) unit 110, storage unit of expanded partition area information for each gradient 120, display area management unit 130, display unit 135, and control unit 150.

FIGS. 3 and 4 show examples of information required for partitioning and expanding a keypad screen in a keypad display apparatus of a portable device. Particularly, FIGS. 3 and 4 show information stored in the storage unit of expanded partition area information for each gradient 120 illustrated in FIG. 2. FIG. 3 shows a structure of a first database 120a storing partition area information of a keypad area displayed on the screen of the portable device, and FIG. 4 shows a structure of a second database 120b storing the partition areas corresponding to the gradients of the portable device.

Referring to FIG. 3, the first database 120a storing partition area information of a keypad area displayed on the screen of the portable device includes a partial area field 121a, a pre-expansion coordinate information field 123a, and a keypad display information field 125a. The partial area field 121a stores information to identify the individual partition areas. The pre-expansion coordinate information field 123a stores pre-expansion coordinates of the corresponding partition areas. The keypad display information field 125a stores keypad display information included in the corresponding partition area. FIG. 3 shows an example in which the keypad area displayed in the portable device is divided into 4 areas.

Figure 5A:
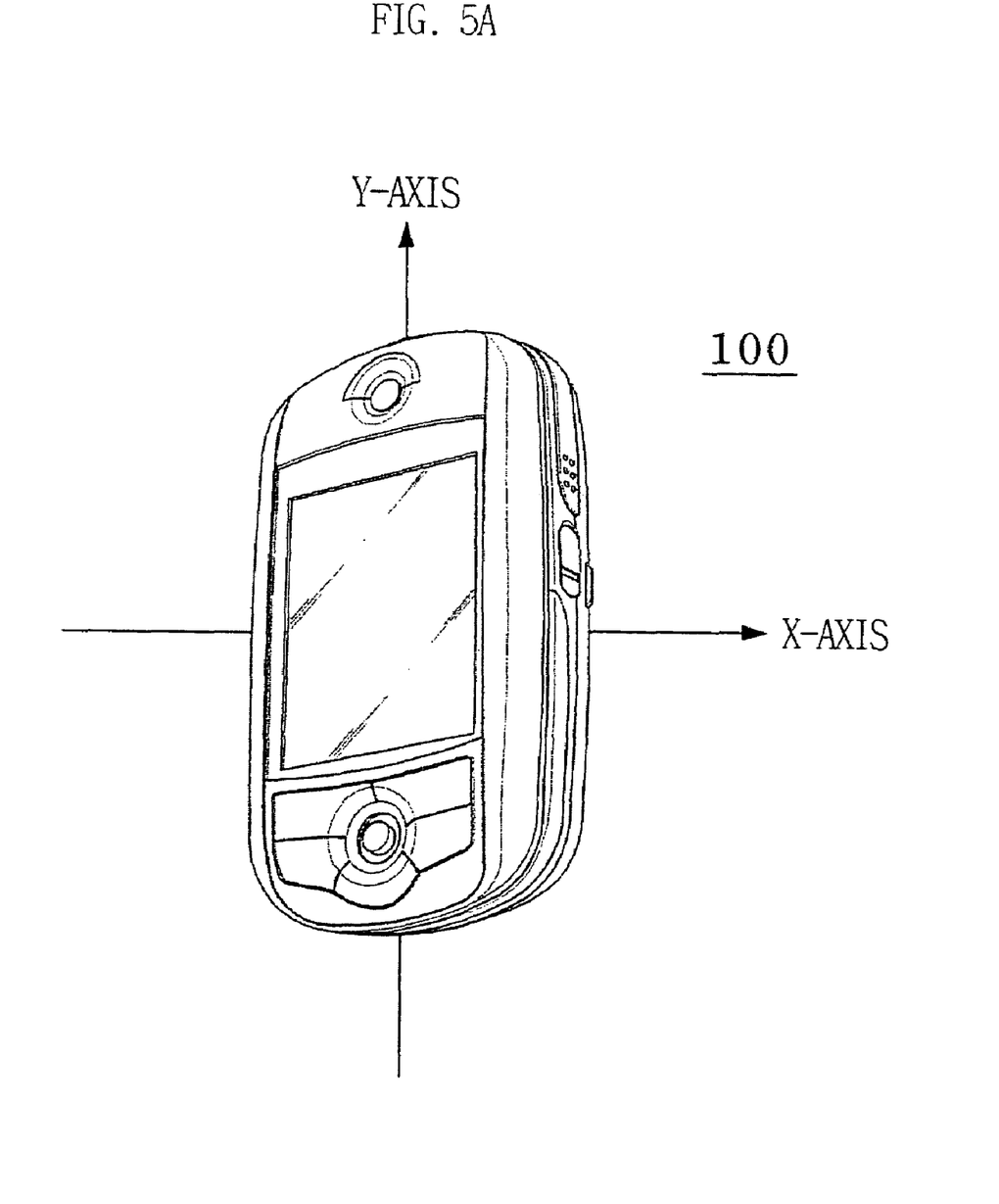
FIGS. 5A to 5B and 6A to 6B are views showing portable devices and keypad displays according to a gradient of a portable device, which are applied to a keypad display method of a portable device according to the present invention.
Figure 5B:
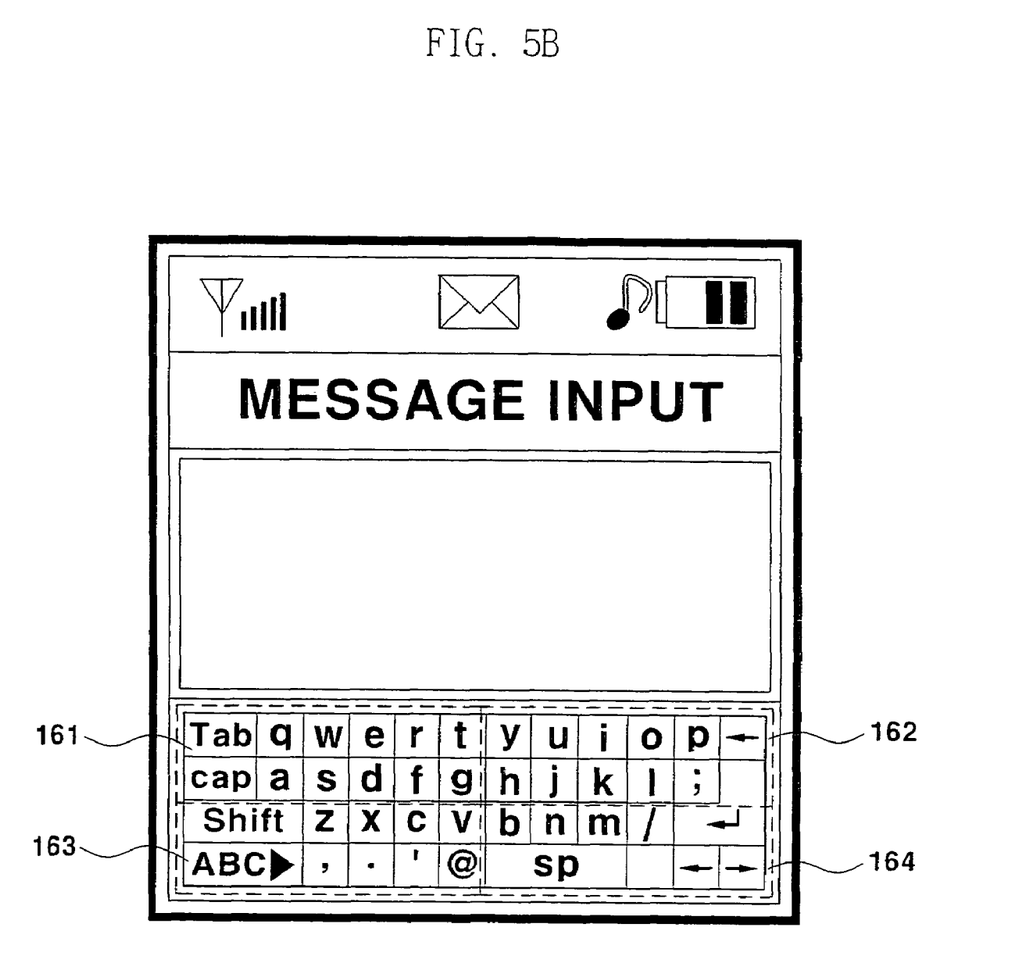

FIG. 5B shows the case in which the keypad is displayed in the portable device after being divided into 4 areas. Referring to FIG. 5B, a first area 161, second area 162, third area 163, and fourth area 164 (shown by the dotted lines), respectively correspond to partial area 1, partial area 2, partial area 3, and partial area 4 shown in FIG. 3. Accordingly, 'coordinate 1' representing a pre-expansion coordinate of the first partial area in FIG. 3 is preferably a coordinate representing a position of the first area 161 on the screen shown in FIG. 5B, and 'keypad display information 1' representing keypad display information of the partial area 1 in FIG. 3 is keypad display information (Tab, q, w, . . . ) included in the first area 161 on the screen shown in FIG. 5B.

Referring to FIG. 4, the second data base 120b includes a gradient field 121b and expanded partition area field 123b, which store the partition area information corresponding to the gradients of the portable device. The gradient field 121b stores gradient information that is a base for expanding and displaying a specific area of the keypad displayed in the portable device. Here, a specific value or range of the gradient is preferably stored in the gradient field 121b. The expanded partition area field 123b stores area information to be expanded among the partition areas according to the corresponding gradient information. Identification information for each of the partition areas stored in the partial area field 121a of the first database 120a is preferably selected and stored in the expanded partition area field 123b.

Figure 6A:
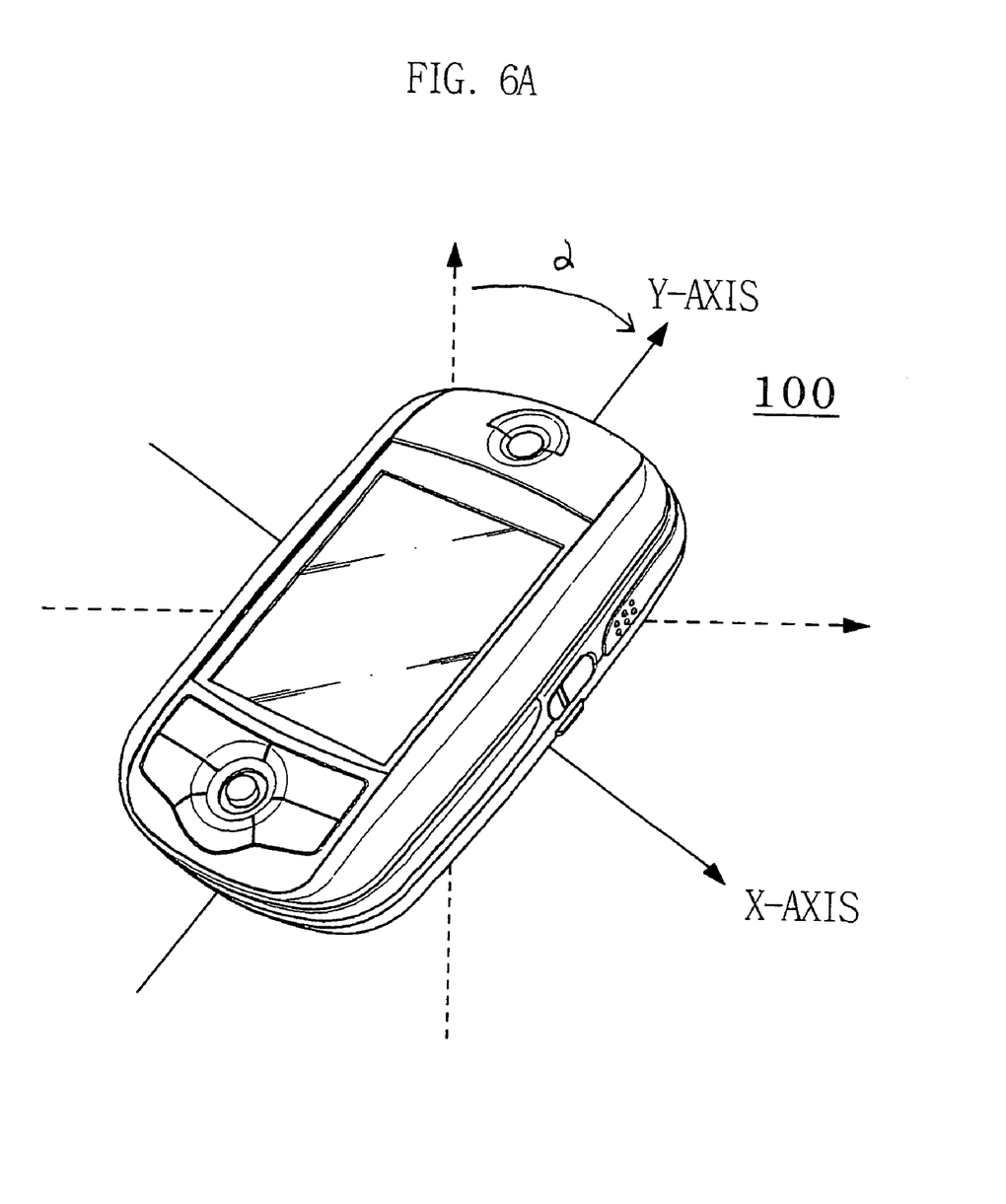
Figure 6B:
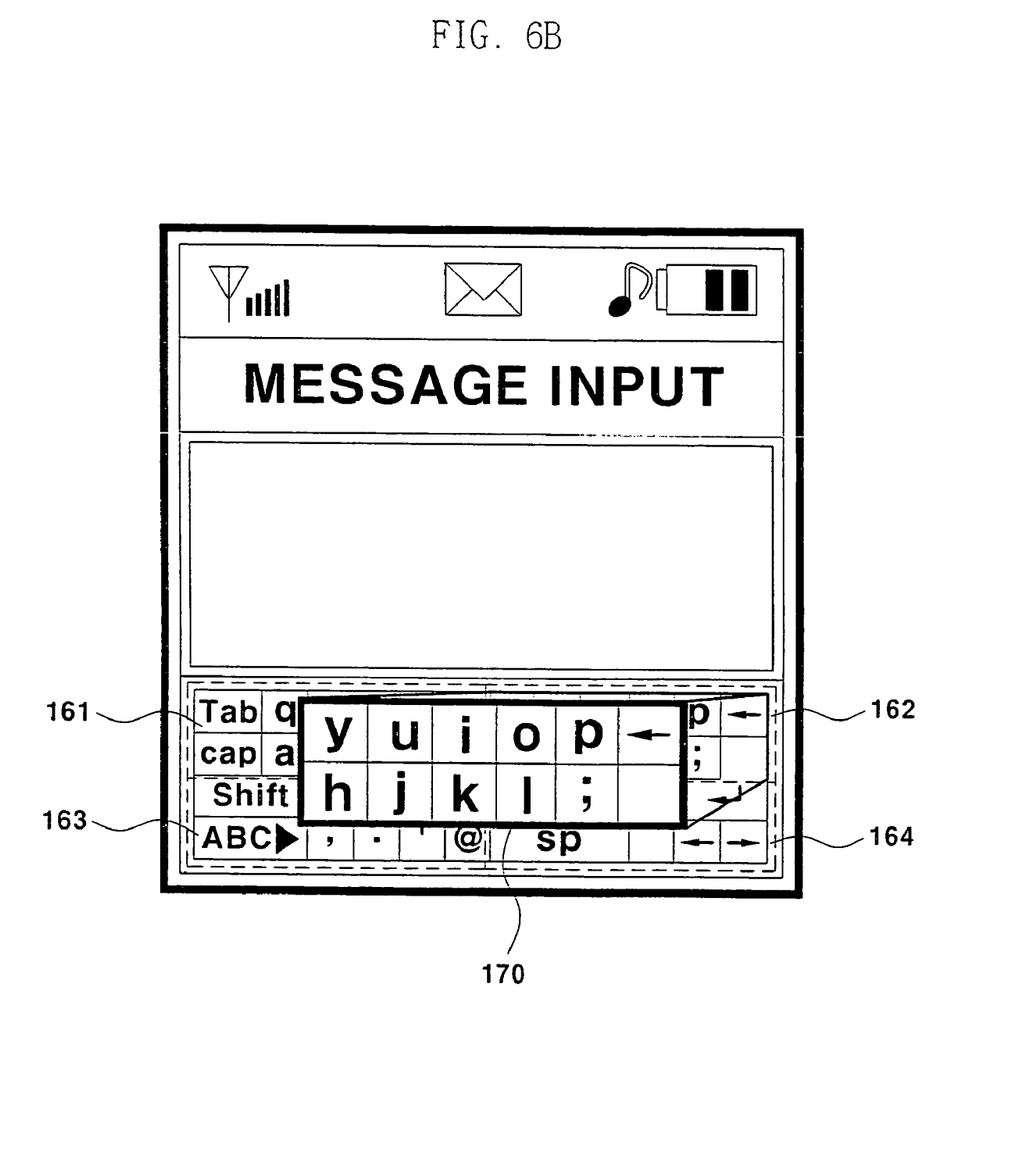

FIGS. 5A-5B and 6A-6B are views showing portable devices and keypad displays according to gradients of the portable device, which are applied to a keypad display method of a portable device according to the present invention. FIGS. 5A and 5B show an example of the portable device and keypad display respectively, when the gradient of the portable device 100 is '0'. FIGS. 6A and 6B show an example of the portable device and keypad display respectively, when the gradient of the portable device 100 is 'α'.

Particularly, FIG. 6B shows an example in which the second area 162 is expanded as a pop-up on the keypad screen display shown in FIG. 5B, when the portable device 100 is tilted as shown in FIG. 6A. Referring to FIG. 6B, an expansion display window 170 is preferably displayed as a pop-up in the center of the entire keypad area, and on a basic, pre-expansion keypad.

Although the expansion display window 170 is preferably displayed as a pop-up in the center of the entire keypad area, as shown in FIG. 6B, the display form of the expansion display window 170 is not limited to the example shown in FIG. 6B. The expansion display window 170 may also be expanded and displayed based on one of the four corner points of the partition area. For example, the first area 161 may be expanded and displayed, based on the upper-left corner point; the second area 162 may be expanded and displayed, based on the upper-right corner point; the third area 163 may be expanded and displayed, based on the lower-left corner point; and the fourth area 164 may be expanded and displayed, based on the lower-right corner point.

In the above example, the portable device preferably includes all portable apparatus having a display unit (for example, a personal digital assistant (PDA), a mobile phone, etc.).

As described above, the keypad display method of a portable device and an apparatus according to the present invention has an effect on reducing errors of character input in a portable device performing display of soft-buttons or inputs through soft-buttons. Additionally, the keypad display method of a portable device and apparatus according to the present invention has an effect of providing convenience for a user by enabling fast search of input characters and simply expanding a specific area of a keypad.

Hereinabove, preferred embodiments and drawings of the present invention have been disclosed for illustrative purpose. However, the present invention is not limited to the above embodiments, and those skilled in the art will appreciate that various substitutions, modifications, and changes are possible, without departing from the scope and spirit of the invention as disclosed in the accompanying claims.

What is claimed is:

1. A keypad display method of a portable device comprising the steps of: initializing by partitioning a keypad display area of a portable device and storing each partition area corresponding to individual gradients;
    checking whether an operation mode of the portable device requires a keypad display;
    displaying a keypad in a specific area of a portable device screen, if the operation mode of the portable device requires the keypad display, according to the checking result;
    detecting the gradient of the portable device;
    selecting a partition area corresponding to the detected gradient referring to information stored in the initialization step; and
    expanding and displaying the selected partition area.

2. The keypad display method of claim 1, further comprising confirming the expanded display area by selecting a predetermined hard-key button.

3. The keypad display method of claim 2, further comprising performing key input by utilizing the confirmed expanded display area.

4. The keypad display method of claim 1, wherein the initialization step stores partition areas corresponding to a specific gradient.

5. The keypad display method of claim 1, wherein the initialization step stores partition areas corresponding to a specific range of gradients.

6. The keypad display method of claim 1, wherein the checking step identifies whether the operation mode of the portable device is a character input mode.

7. The keypad display method of claim 1, wherein the display step utilizes pre-stored key arrangement information.

8. The keypad display method of claim 1, wherein the expansion step displays a pop-up in a predetermined area of the entire keypad area.

9. The keypad display method of claim 8, wherein the expansion step displays the pop-up in a center of the entire keypad area.

10. The keypad display method of claim 8, wherein the expansion step expands and displays a partition area based on a corner point of the partition area.

11. A keypad display apparatus of a portable device comprising: a gradient sensing unit detecting the gradient of the portable device;
 a storage unit of expanded partition area information for each gradient, which stores screen partition information of the portable device and expanded partition area information corresponding to the gradient of the portable device;
 a control unit for selecting partition area information to be expanded corresponding to the gradient from the storage unit, if the gradient of the portable device is transferred from the gradient sensing unit; and
 a display area management unit for reconfiguring information to be displayed on the portable device screen according to the expanded partition area information.

12. The keypad display apparatus of claim 11, wherein the gradient sensing unit includes at least one gradient sensor.

13. The keypad display apparatus of claim 11, wherein the gradient sensing unit includes at least one gravity sensor.

14. The keypad display apparatus of claim 11, wherein the storage unit includes a first database that stores partition area information by dividing the keypad display area of the portable device into a predetermined number of partition areas, and a second database that stores the partition areas corresponding to each gradient.

15. The keypad display apparatus of claim 14, wherein the first database includes:
 a partial area field for storing identification information of the partition area;
 a pre-expansion coordinate information field for storing pre-expansion coordinates of the corresponding partition area; and
 a keypad display information field for storing keypad display information included in the corresponding partition area.

16. The keypad display apparatus of claim 14, wherein the second database includes:
 a gradient field for storing gradient information that is a base to expand and display a specific area to be displayed on the portable device; and
 an expanded partition area field for storing information of an area to be expanded among the partition areas according to the corresponding gradient information.

17. The keypad display apparatus of claim 16, wherein the gradient field stores a specific value of gradient.

18. The keypad display apparatus of claim 16, wherein the gradient field stores a specific range of gradients.

19. The keypad display apparatus of claim 11, wherein the display area management unit reconfigures screen display information of the portable device so that the expanded partition area is displayed as a pop-up in a predetermined area of the entire keypad area.

20. The keypad display apparatus of claim 19, wherein the display area management unit reconfigures the screen display information of the portable device so that the expanded partition area is displayed in a center of the entire keypad area.

21. The keypad display apparatus of claim 19, wherein the display area management unit expands and displays the partition area based on a corner point of the partition area.

22. The keypad display apparatus of claim 11, wherein the portable device is one of a PDA and a mobile phone that displays soft-buttons or performs input through the soft-buttons.

* * * * *